(12) United States Patent
Hogan

(10) Patent No.: US 11,560,682 B2
(45) Date of Patent: Jan. 24, 2023

(54) OUTLET VALVE FOR A RISER OF A SURFACE IRRIGATION SYSTEM AND RISER

(71) Applicant: Allied Entities Pty Ltd, Numurkah (AU)

(72) Inventor: Michael Hogan, Numurkah (AU)

(73) Assignee: ALLIED ENTITIES PTY LTD, Numurkah (AU)

( * ) Notice: Subject to any disclaimer, the term of this patent is extended or adjusted under 35 U.S.C. 154(b) by 942 days.

(21) Appl. No.: 16/336,851

(22) PCT Filed: Sep. 26, 2017

(86) PCT No.: PCT/AU2017/051045
§ 371 (c)(1),
(2) Date: Mar. 26, 2019

(87) PCT Pub. No.: WO2018/058178
PCT Pub. Date: Apr. 5, 2018

(65) Prior Publication Data
US 2021/0285177 A1  Sep. 16, 2021

(30) Foreign Application Priority Data
Sep. 28, 2016 (AU) ................................ 2016903934

(51) Int. Cl.
*F16K 31/50* (2006.01)
*E02B 13/02* (2006.01)
(Continued)

(52) U.S. Cl.
CPC .............. *E02B 13/02* (2013.01); *A01G 25/16* (2013.01); *F16K 1/16* (2013.01); *F16K 31/502* (2013.01)

(58) Field of Classification Search
CPC .......... F16K 1/02; F16K 1/2007; F16K 1/221; F16K 1/48; F16K 27/006; F16K 27/0227;
(Continued)

(56) References Cited

U.S. PATENT DOCUMENTS 1,388,246 A * 8/1921 Elliott .................. F16K 1/2007
251/228
2,050,448 A * 8/1936 Muller .................. F16K 1/2028
251/264
(Continued)

FOREIGN PATENT DOCUMENTS

AU         60151/86 A      1/1988
CN         202514377 U    11/2012

OTHER PUBLICATIONS

International Search Report issued by the Australian Patent Office, dated Jan. 17, 2018, 4 pages.
(Continued)

*Primary Examiner* — Hailey K. Do
(74) *Attorney, Agent, or Firm* — McAndrews Held & Malloy, Ltd.

(57) ABSTRACT

A riser for a surface irrigation system has a housing and an outlet valve. The housing has an open upper portion and an outlet defining an orifice. The valve includes an upper closure, a valve member, and an actuating lever. The upper closure is securable to the riser. The valve member is coupled to the closure and mountable within a flow path of the fluid, the valve member operable for opening and closing the valve, and configured to seat against a valve seat of the housing, and on an upstream side of the orifice, whereby the pressure of fluid within the valve urges the valve member against the seat when the valve is closed. The pivotable actuating lever having one end extending through the orifice and coupled to the valve member, and an operable end for operating the valve member to open and close the valve.

19 Claims, 8 Drawing Sheets

(51) Int. Cl.
*A01G 25/16* (2006.01)
*F16K 1/16* (2006.01)

(58) Field of Classification Search
CPC .... F16K 31/041; F16K 31/043; F16K 31/502; F16K 31/54
See application file for complete search history.

(56) References Cited

U.S. PATENT DOCUMENTS

| | | | | |
|---|---|---|---|---|
| 2,499,409 | A * | 3/1950 | Norway | F17C 7/04 137/448 |
| 2,999,666 | A * | 9/1961 | Sjogren | F16K 1/2028 251/228 |
| 3,572,630 | A * | 3/1971 | Mendenhall | E02B 13/02 137/320 |
| 4,628,956 | A * | 12/1986 | Roberts | F16K 31/24 137/433 |
| 8,991,415 | B1 | 3/2015 | Luppino | |
| 11,112,011 | B1 * | 9/2021 | Murphy | F16K 1/2007 |
| 2019/0282844 | A1 * | 9/2019 | Traphagan | A62C 35/20 |

OTHER PUBLICATIONS

Written Opinion issued by the Australian Patent Office, dated Jan. 17, 2018, 3 pages.

\* cited by examiner

OUTLET VALVE FOR A RISER OF A SURFACE IRRIGATION SYSTEM AND RISER

CROSS-REFERENCE TO RELATED APPLICATIONS

This application is a national stage entry of International Patent Application No. PCT/AU2017/051045, filed on Sep. 26, 2017, titled "OUTLET VALVE FOR A RISER OF A SURFACE IRRIGATION SYSTEM AND RISER," which claims priority from Australian Patent Application No. AU2016903934, filed on, Sep. 28, 2016, titled "Pressure Seal Riser," the disclosures of which are incorporated herein by reference in their entirety.

FIELD OF THE INVENTION

The present invention relates to an outlet valve for a riser of a surface irrigation system. The present invention also relates to a riser including such a valve.

BACKGROUND

Pipe and riser irrigation systems can be an efficient way to deliver irrigation water for surface irrigation. Pipe and riser irrigation systems can be used as an alternative to open channels, which can be prone to clogging, leakage and evaporation losses.

Outlet valves for pipe and riser irrigation systems can be difficult to operate, particularly due to the variation in pressure of the irrigation fluid. In use, the irrigation fluid pressure can vary, particularly if other valves in the system and opened or closed. Also, if pressure drops within the system, for example in the event of the irrigation pump ceasing operation, the water column within the riser can abruptly drop, causing the creation of a vacuum within the riser that can lead to collapsing and damage of the riser.

Furthermore, closing the valve against the pressure of irrigation fluid can be difficult, leaving the outlet valve prone to damage and/or leakage.

There is a need to address the above, and/or at least provide a useful alternative.

SUMMARY

There is provided an outlet valve for a riser of a surface irrigation system, the riser having a housing with an open upper portion and an outlet defining an orifice through which irrigation fluid is to be discharged, wherein the valve includes:

an upper closure securable to the riser for sealing the open upper portion;

a valve member coupled to the closure and mountable within a flow path of the fluid, the valve member operable for opening and closing the valve, and configured to seat against a valve seat of the housing, and on an upstream side of the orifice, whereby the pressure of fluid within the riser urges the valve member against the seat when the valve is closed; and a pivotable actuating lever having one end extending through the orifice and coupled to the valve member, an intermediate fulcrum, and an operable end for operating the valve member to open and close the valve.

In a preferred embodiment, the actuating lever is slidably coupled to the valve member.

Preferably, the valve further includes a drive member extending between a drive member mount that is provided on the closure and the operable end of the actuating lever, the drive member being configured to advance and retract relative to the drive member mount so as to operate the valve. In some embodiments, the drive member and drive member mount are configured such that rotation of the drive member causes advancement and retraction of the drive member relative to the drive member mount. The drive member can include a drive head and an external thread, and the drive member mount can include an internally threaded hole, whereby rotation of the drive member causes displacement of the drive member relative to the drive member mount. In some alternative embodiments, the valve includes an electric drive and a control system mounted on the closure to automatically control the valve.

Preferably, the valve further includes a support arm extending from the closure for supporting the actuating lever at the fulcrum. The support arm can be integrally formed with the closure.

Preferably, the valve member is pivotably mounted with respect to the orifice and pivots upwardly away from the orifice to open the valve. More preferably, the valve member is suspended from the closure.

The valve can further include a vacuum and/or air relief valve.

There is also provided a riser for a surface irrigation system, including:

a riser housing having an open upper portion and an outlet defining an orifice through which irrigation fluid can flow, and an outlet valve of the above described type.

Preferably, the housing is in the form of a T-piece with a longitudinal axis of the open upper portion and orifice being substantially 90 degrees apart.

There is also provided a surface irrigation system comprising a pipe network that is connected to a source of irrigating fluid, and one or more risers of the above described type.

There is also provided a method of operating an outlet valve of a riser of a surface irrigation system, including the steps of providing a valve of the above described type, securing the valve to the riser, and moving the operable end of the actuating lever to open and close the valve.

BRIEF DESCRIPTION OF THE DRAWINGS

In order that the invention may be more easily understood, an embodiment will now be described, by way of example only, with reference to the accompanying drawings, in which.

DETAILED DESCRIPTION

Figure 1:
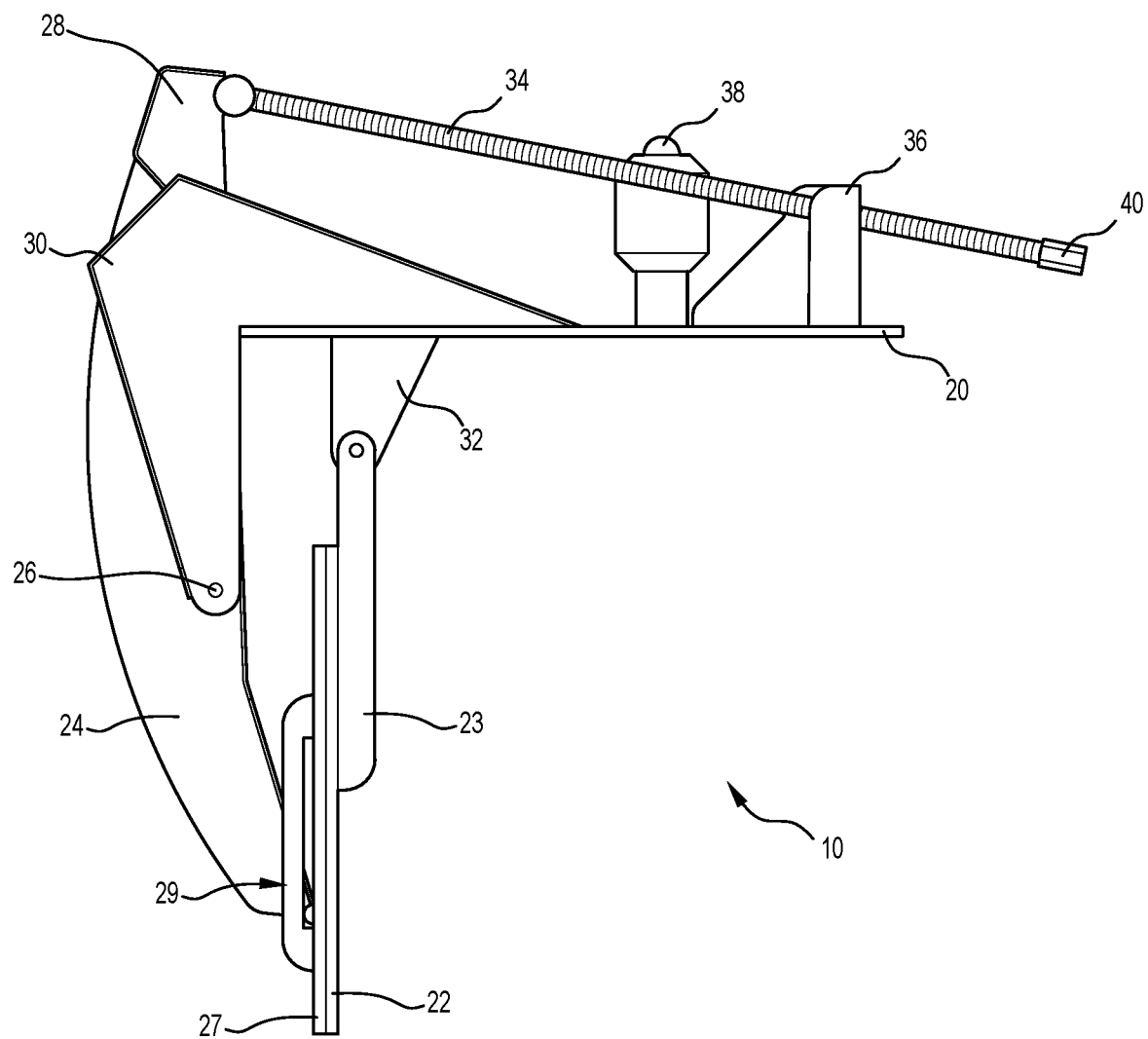
FIG. 1: is a right side view of the outlet valve according to a first embodiment of the invention.
Figure 2:
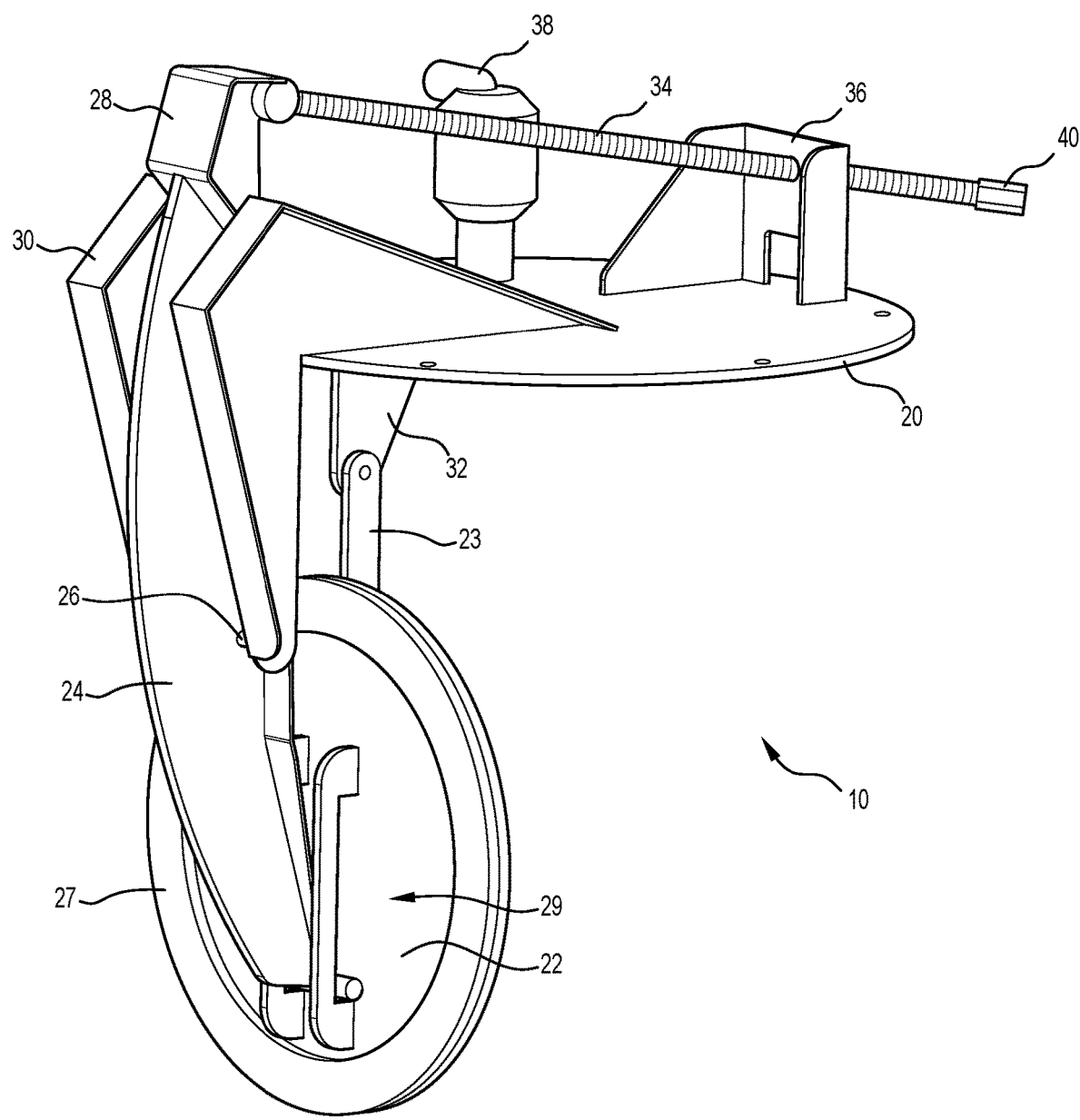
FIG. 2: is a front, right perspective view of the outlet valve of FIG. 1.
Figure 3:
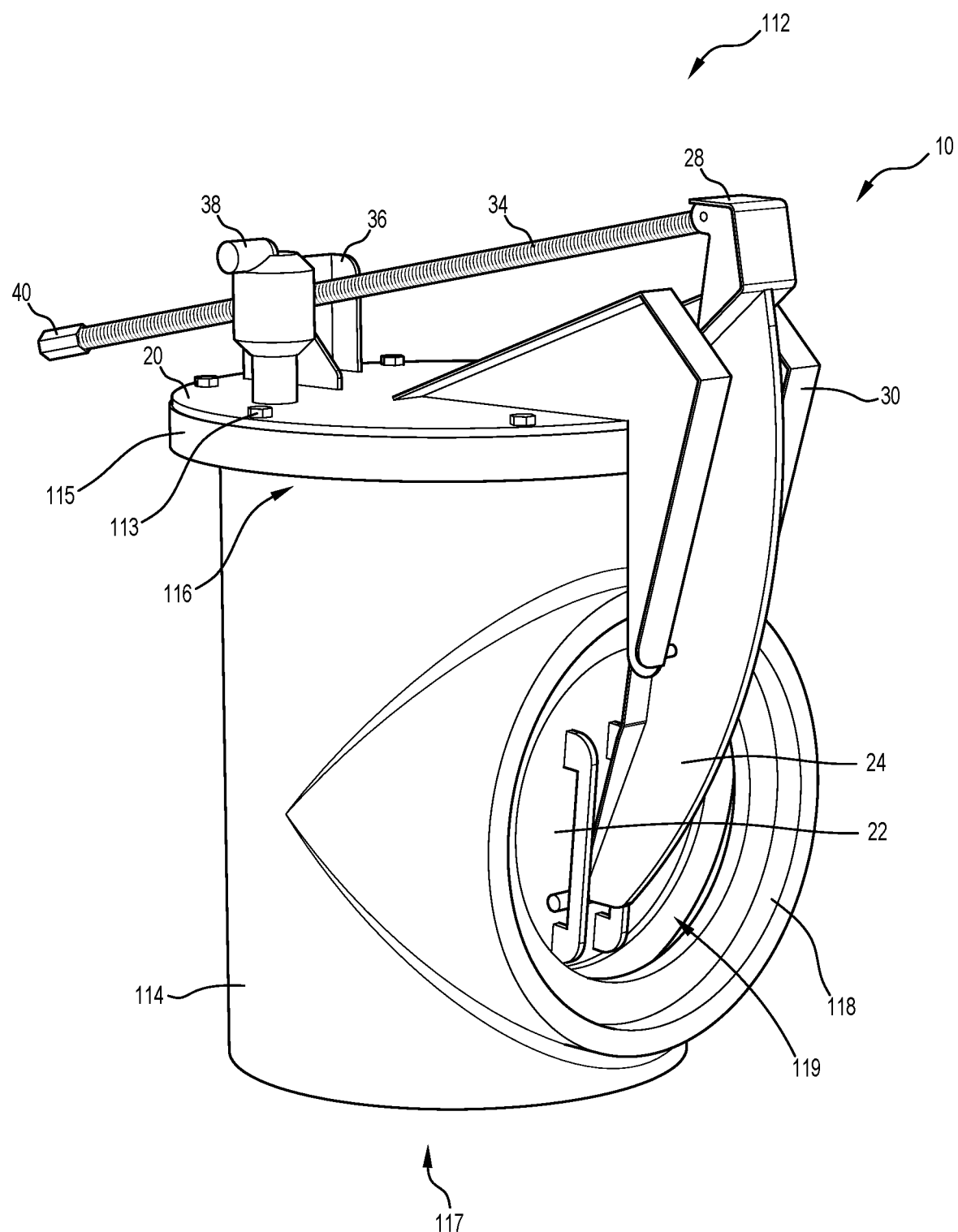
FIG. 3: is a front, right perspective view of a riser for a surface irrigation system according to one embodiment of the invention, the valve being shown in a closed condition.
Figure 4:
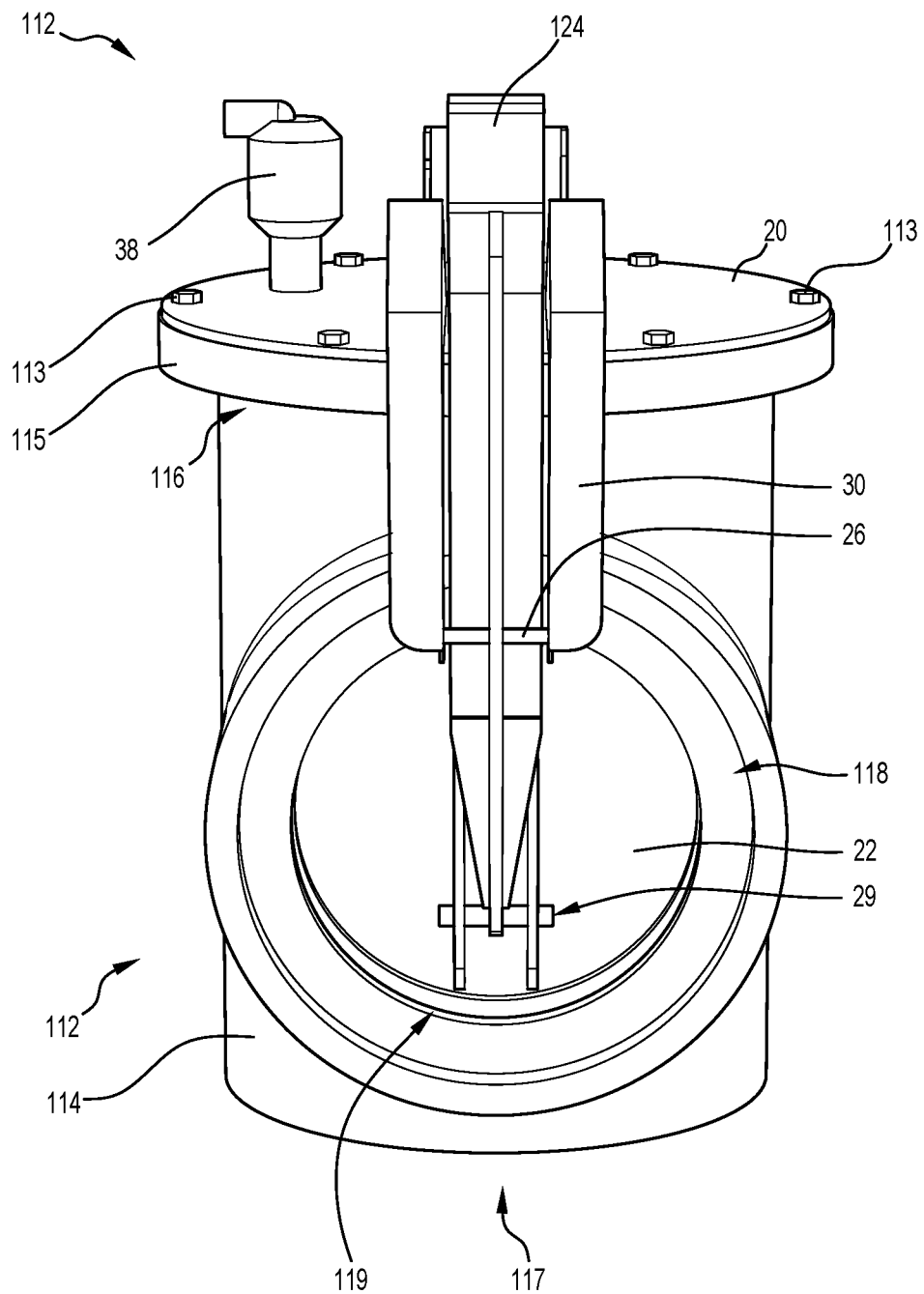
FIG. 4: is a front view of riser of FIG. 3.

FIGS. 1 and 2 illustrate an outlet valve 10 according to an embodiment of the invention. FIGS. 3 to 6 show a riser 112 for a surface irrigation system. In the embodiment of FIGS. 3 to 6, the riser 112 includes a riser housing 114 that defines an internal cavity. Further, the riser housing 114 includes an upper portion 116, and an outlet 118 that defines an orifice 119 through which irrigation fluid can be discharged. The upper portion 116 defines an opening of the riser housing 114. The riser 112 also includes the valve 10 of FIGS. 1 and 2.

The irrigation fluid for surface irrigation is typically water, though may take other forms such as dairy effluent for example. The irrigation fluid will be referred to herein as water for simplicity without wishing to be so confined to this fluid.

The valve 10 includes an upper closure 20 that is to be secured to the riser 112 so as to close and seal the open upper portion 116 of the riser 112. A valve member 22 is coupled to the closure 20 and mountable within a flow path of irrigation fluid through the riser 112. The upper closure 20 is in the form of a plate that is to be secured to the open upper portion 116 of the housing 114 by bolts 113. The valve member 22 is operable for opening and closing the valve 10. Further, the valve member 22 is configured to seat against a valve seat (not shown) on an internal surface of the housing 114 and on an upstream side of the orifice 119. An annular seal 27 may be provided on the valve member 22 to contact the valve seat, and facilitate a good seal. If desired, the annular seal 27 can be made of a compressible material.

As will be appreciated from the following description, the pressure of fluid within the cavity urges the valve member 22 against the seat when the valve 10 is closed. Accordingly, the pressure of the water is used to improve the sealing of the valve 10 so as to reduce leakage. Advantageously, as the water pressure increases, so does the pressure on the valve seat and the effectiveness of the seal.

The valve 10 also includes a pivotable actuating lever 24, with one end that extends through the orifice 119 and that is coupled to the valve member 22. The actuating lever 24 also has an intermediate fulcrum 26, and an operable end 28 for operating the valve member 22 to open and close the valve 10. Providing an operable end 28 that extends externally of the valve 10 allows for simplified operation externally of the valve 10, either manually or automatically. The working components of the valve 10 are also freely accessible for servicing.

The valve 10 also includes a support arm 30 extending from the closure 20 for supporting the actuating lever 24 at the fulcrum 26. To this end, The actuating lever 24 is connected to the support arm 30 by a pivot coupling (not shown). In this embodiment, the support arm 30 extends outwardly and downwardly from the closure 20 to a location near an upper portion of the valve member 22. In the example shown, the support arm 30 is integrally formed with the closure 20. In this regard, the support arm is formed of two platelike and generally parallel members welded to the closure 20, though it will be appreciated that it may be otherwise constructed, such as in separate parts or with a single member for example.

Figure 5:
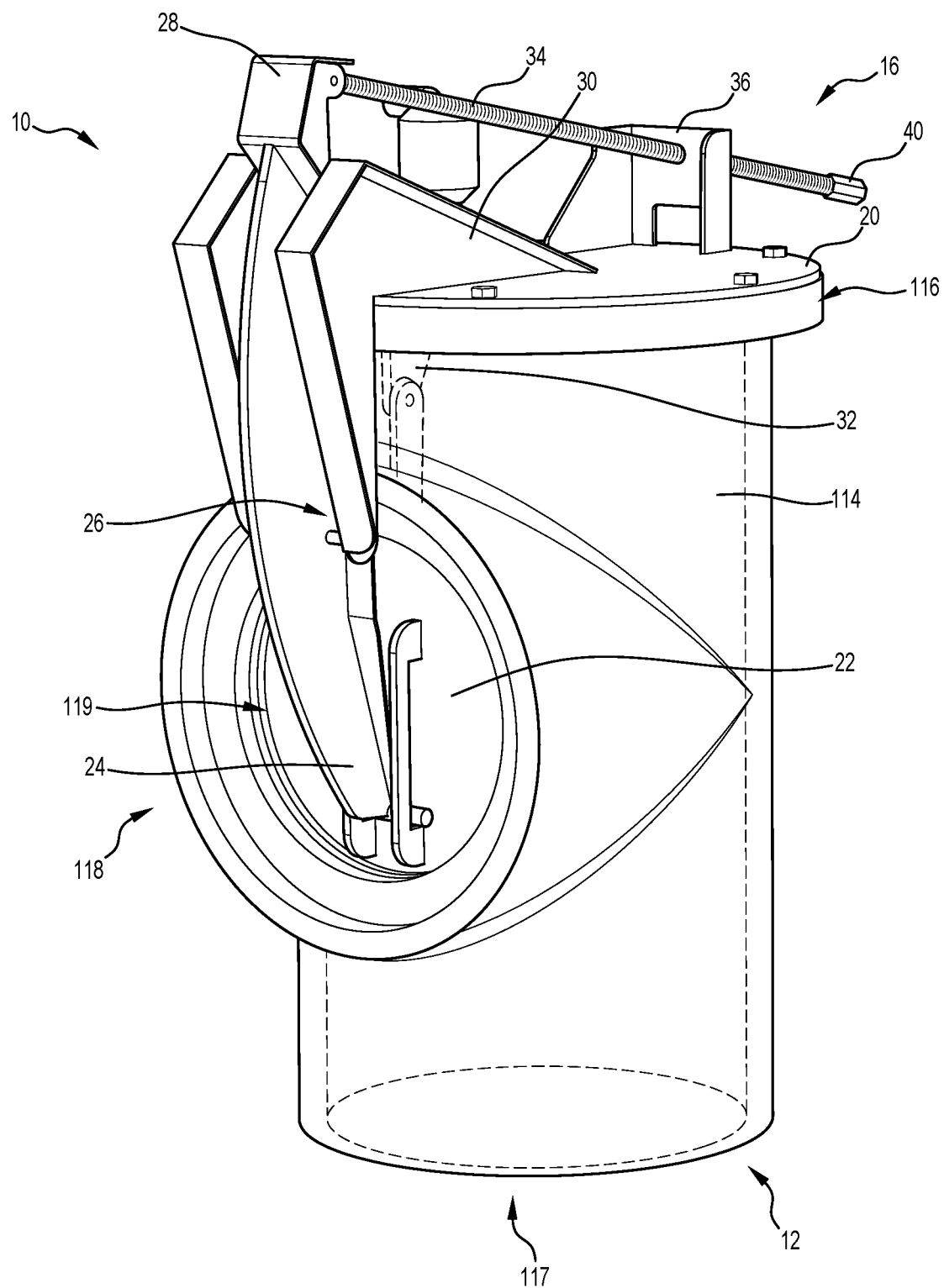
FIG. 5: is a front, right perspective view of the riser of FIG. 3, with the valve being shown in a closed condition.
Figure 6:
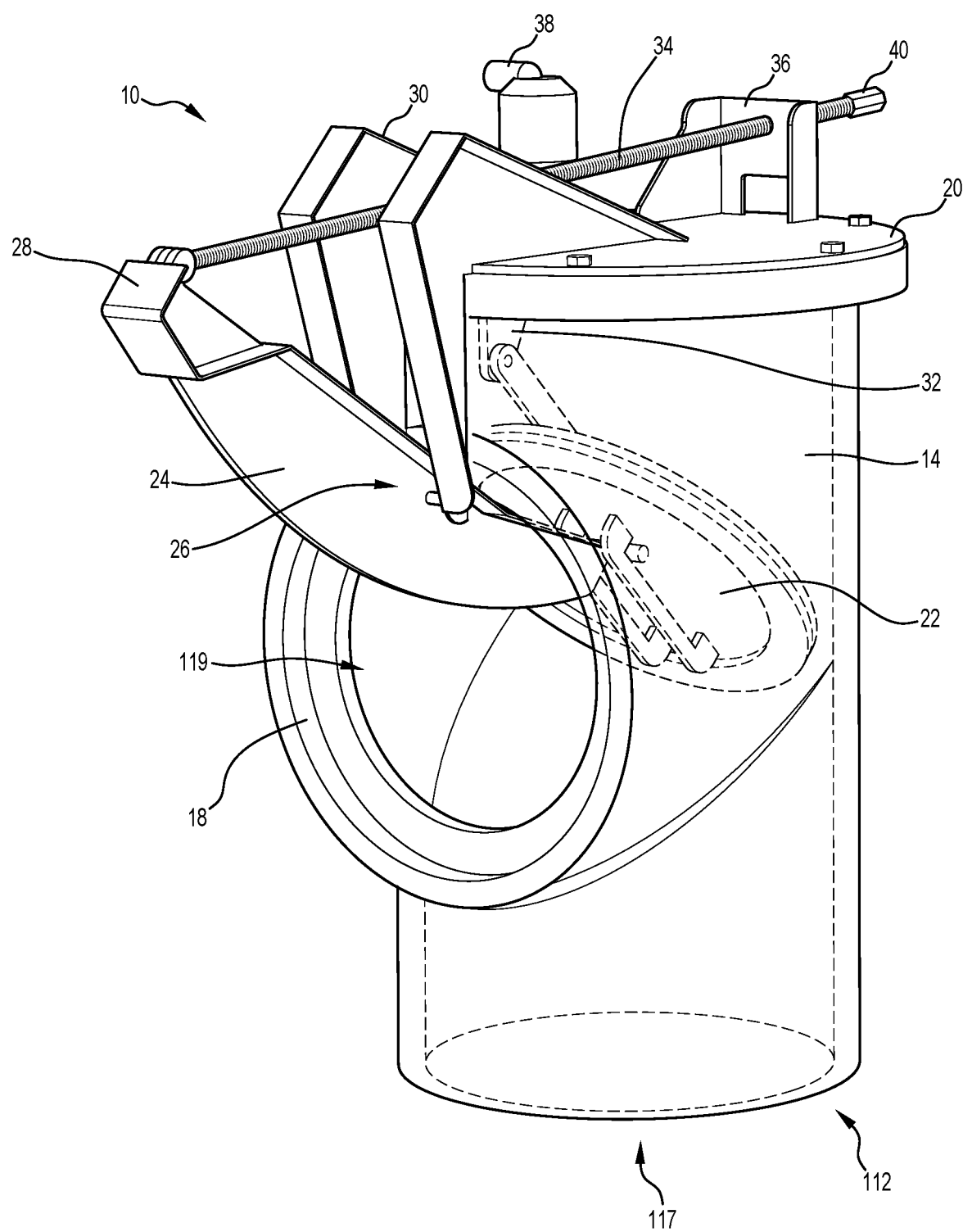
FIG. 6: is a front, right perspective view of the riser of FIG. 3, with the valve being shown in an open condition.

In FIGS. 5 and 6, the riser housing 114 is shown "semi-transparent" to better show the components of the valve 10 within the internal cavity of the housing 114. The valve member 22 is pivotably mounted with respect to the orifice 119 so as to pivot or swing upwardly away from the orifice 119 to open the valve 110. This enables the valve member 22 to move out of the fluid flow path when in the fully opened position to reduce obstruction to fluid flow and minimize head loss, particularly in low flow situations. The valve member 22 moves within the fluid flow path while moving to a closed position, and seats against the valve seat (not shown) on an upstream side of the orifice 19 with the pressure of fluid acting on the valve member 22 against the seat to keep the valve 10 closed and sealed. Further, as will be appreciated particularly from FIG. 4, as the valve member 22 is moving towards the fully closed position, the valve member 22 is also moving forwardly along the fluid flow path.

In the assembled riser 112, the valve member 22 is to pivot upwardly away from the orifice to open the valve 10. To enable this movement, valve member 22 is suspended within the cavity of the riser 12. As shown particularly in FIG. 1, the valve member 22 is suspended from the closure 20 via member 32 extending from the closure 20, though it will be appreciated that it may be otherwise mounted, such as from a member extending within housing 14. In this particular embodiment, the valve member 22 includes an arm 23 that is pivotally coupled to member 32.

In operation of the valve 10, the operable end 28 is engaged and driven, which causes the lever 24 to pivot about fulcrum 26 and, in turn, causes the valve member 22 to pivot between the fully open and fully closed positions of the valve 10. To this end, the valve 10 is fitted with a drive member 34 that extends between the operable end 28 of the actuating lever 24, and a drive member mount 36 that is mounted on the closure 20. The drive member 34 is configured to advance and retract relative to the drive member mount 36, and is pivotally connected to the actuating lever 24. Thus, advancement/retraction of the drive member 34 causes the actuating lever 24 to pivot, which displaces the valve member 22.

In this particular embodiment, the drive member 34 is in the form of a threaded rod, and the mount 36 includes an internally threaded hole through which the drive member 34 extends. Rotation of the drive member 34 causes the advancement/retraction described above.

Figure 7:
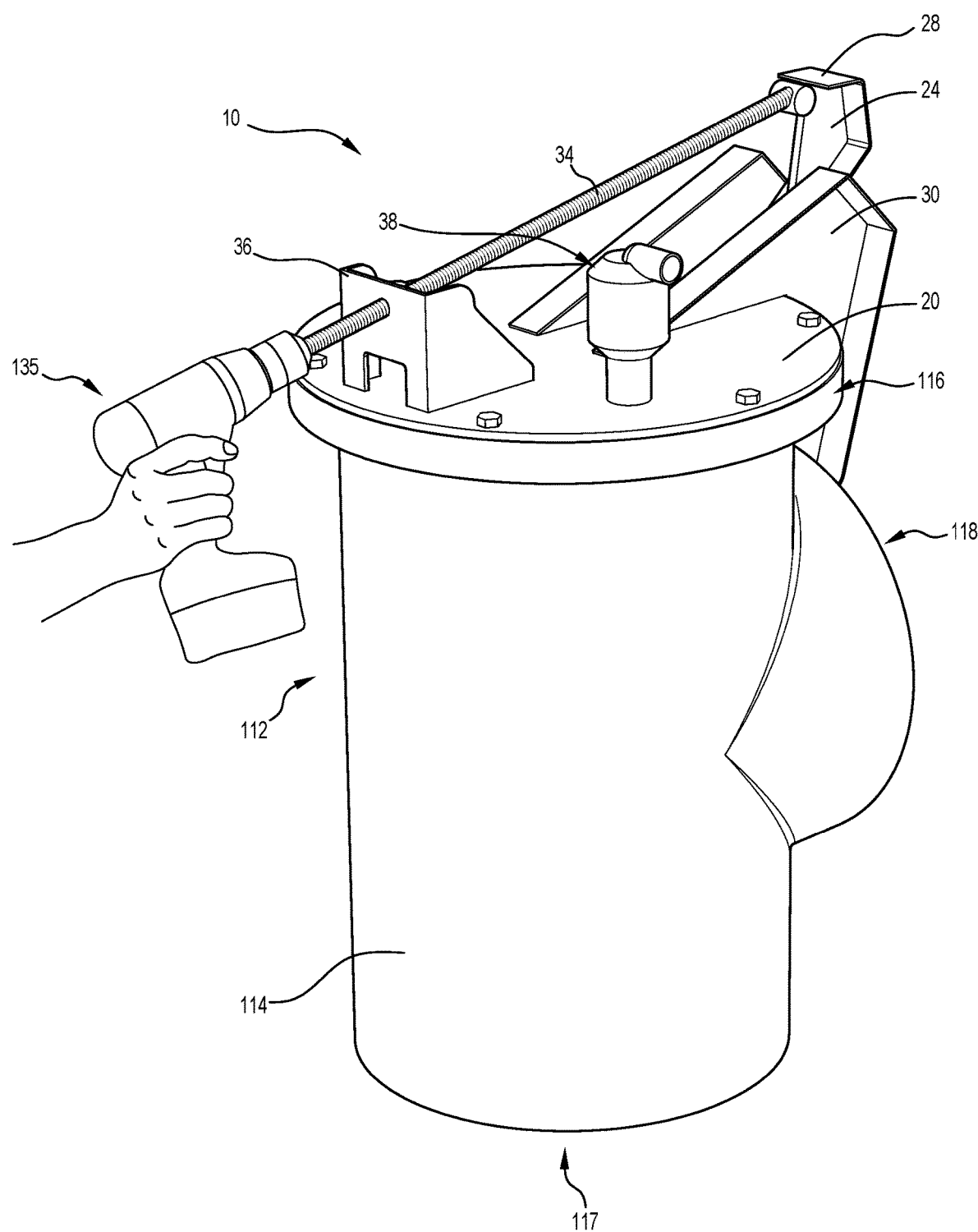
FIG. 7: is a rear perspective view of the riser of FIG. 3, together with an electrically operable hand tool positioned to operate the valve.

In this particular embodiment, the drive member 34 has a drive head 40 at the opposite end to the actuating lever 24. As shown in FIG. 7, an electrically operable hand tool 135, such as an electric drill, can be coupled to the drive head 40, and used to operate the valve 10. Advantageously, a user can carry this common tool, which is easily charged as required, with them to operate a series of valves as required. In an alternative embodiment, the drive member 34 can be provided with a handle (instead of the drive head) and configured for manual operation by a user wishing to operate the valve.

Valve 10 also includes a vacuum and/or air relief valve 38. Valve 38 can be configured to allow air within the riser 112 to escape, as the pressure of water within the valve increases, and also to allow air to enter the riser 112 when the column of fluid in the riser 112 retracts to prevent collapsing of the riser 112 and/or associated pipes due to a strong vacuum within the system.

As will be evident from FIGS. 3 to 6, the actuating lever 24 is coupled to the valve member 22 by a slide coupling 29 so that as the end of the actuating lever 24 bears against the valve member 22, sliding is permitted to allow the valve member 22 to pivot upwardly. Advantageously, such a simple configuration requires little maintenance and can prevent jamming of the valve member 22 in operation of the valve 10.

As shown in FIGS. 3 to 6, the housing 114 has an annular flange 115 that surrounds the opening at the upper portion 116. In the assembled riser 112, the closure 20 is attached to the annular flange 115 to close and seal the open upper end 116. The riser housing 114 has an inlet end 117 that is opposite the upper end 116. A longitudinal axis of the housing 114 extends through the upper end 116, and also through the inlet end 117. In this embodiment, the housing 114 is shaped such that the outlet 18 discharges water in a direction that is transverse to the longitudinal axis, and in this example at approximately 90 degrees to the longitudinal axis. Accordingly, the housing 114 is formed as a T-piece. However, it will be appreciated that the housing 114 may be otherwise constructed, with a different external shape for example.

When installed within a surface irrigation system, the inlet end 117 of the riser housing 114 is connected to a pipe (not shown), which may be buried underground. When the valve 10 is open, water is to flow upwardly into the cavity of the riser housing 114 via the inlet end 117. As previously described, water is then to be discharged via the outlet 118. Thus, there is a flow path of water from the inlet end 117 through the cavity of the housing 114, to the outlet 118.

The riser 112 is constructed with sufficient rigidity to withstand contact by animals, in particular those rubbing or scratching against the riser.

Figure 8:
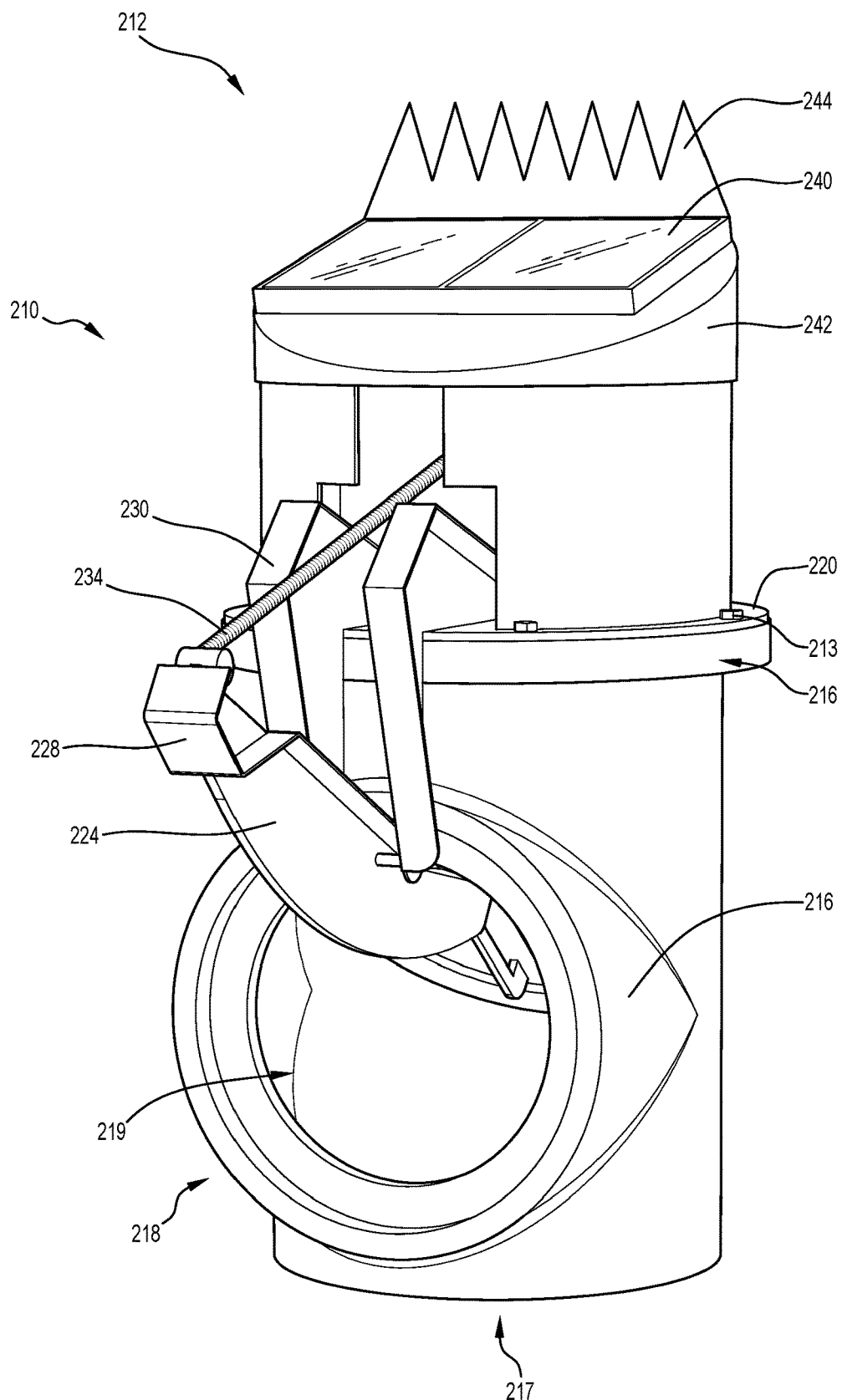
FIG. 8: is a perspective view of a riser valve according to a further embodiment of the invention.

FIG. 8 illustrates a riser 212 according to another preferred embodiment of the invention. The riser 212 includes a riser housing 214, and an outlet valve 210. Outlet valve 210 shares numerous like components that are similar to components of the outlet valve 10, and these components have the same reference numbers incremented by 200. Similarly, the riser housing 214 numerous like components that are similar to components of the riser housing 114, and these components have the same reference numbers incremented by 100.

In this embodiment, the valve 210 includes an electric drive and a control system 242 mounted on the closure 220 to automatically operate the valve 210. The electric drive and control system 242 includes a worm drive gearbox (not shown) that is driven by an electric motor (also not shown).

The valve 210 may be controllable remotely or programmed to operate based upon predetermined parameters such as time and flow rate. Valve 210 may be one of many valves in an irrigation system, with the operation of each valve being controlled having regard to the irrigation requirements of the farm on which the irrigation system is installed and the availability of the water supply. In some embodiments, the valve 210 may be provided with a wireless communications protocol receiver (or transceiver) to allow remote activation via the internet. Sensors such as flow and pressure sensors or timers may also be provided to allow the capture and logging of operation data. This data may also be transmitted by a wireless network (such as a system that uses Wi-Fi communications protocol, and may include a mesh and/or series of repeaters) to allow monitoring of the valve via the internet.

Solar panel 240 is provided to charge a battery (not shown) to enable automatic operation of the electric drive and control system 242 as required. In other embodiments, a mains power connection may be provided for powering the electric drive and control system 242.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. An outlet valve for a riser of a surface irrigation system, the riser having a housing with an open upper portion and an outlet defining an orifice through which irrigation fluid is to be discharged, wherein the outlet valve includes:
    an upper closure securable to the riser for sealing the open upper portion;
    a valve member coupled to the closure and mountable within a flow path of the fluid, the valve member operable for opening and closing the outlet valve, and configured to seat against a valve seat of the housing, and on an upstream side of the orifice, whereby the pressure of fluid within the outlet valve urges the valve member against the seat when the outlet valve is closed;
    a pivotable actuating lever having one end extending through the orifice and coupled to the valve member, an intermediate fulcrum, and an operable end for operating the valve member to open and close the outlet valve; and
    a drive member that extends between a drive member mount that is provided on the upper closure and the operable end of the actuating lever, the drive member being configured to advance and retract relative to the drive member mount so as to operate the outlet valve.

2. An outlet valve according to claim 1, wherein the actuating lever is slidably coupled to the valve member.

3. An outlet valve according to claim 1, further including an electric drive and a control system mounted on the upper closure to automatically control the outlet valve.

4. An outlet valve according to claim 1, further including a vacuum and/or air relief valve.

5. A method of operating an outlet valve of a riser of a surface irrigation system, including the steps of providing an outlet valve according to claim 1, securing the outlet valve to the riser, and moving the operable end of the actuating lever to open and close the outlet valve wherein moving the operable end of the actuating lever involves operating the drive member to advance and retract the drive member relative to the drive member mount.

6. An outlet valve according to claim 1, wherein the drive member has an external thread, and the drive member mount includes an internally threaded hole, whereby rotation of the drive member causes displacement of the drive member relative to the drive member mount.

7. An outlet valve according to claim 6, further comprising a drive head on an end of the drive member to facilitate rotation of the drive member by coupling with an external tool.

8. An outlet valve according to claim 1, wherein the valve member is pivotably mounted with respect to the orifice and pivots upwardly away from the orifice to open the outlet valve.

9. An outlet valve according to claim 8, wherein the valve member is suspended from the upper closure.

10. An outlet valve according to claim 1, further including a support arm extending from the upper closure for supporting the actuating lever at the intermediate fulcrum.

11. An outlet valve according to claim 10, wherein the support arm is integrally formed with the upper closure.

12. A riser for a surface irrigation system, the riser comprising:
   a riser housing having an open upper portion and an outlet defining an orifice through which irrigation fluid can flow, and
   an outlet valve according to claim 1.

13. A riser according to claim 12, wherein the riser housing is in the form of a T-piece with a longitudinal axis of the open upper portion and orifice being substantially 90 degrees apart.

14. A surface irrigation system comprising a pipe network that is connected to a source of irrigating fluid, and one or more risers according to claim 12.

15. A riser according to claim 12, wherein the actuating lever is slidably coupled to the valve member.

16. A riser according to claim 12, further including a support arm extending from the upper closure for supporting the actuating lever at the intermediate fulcrum.

17. A riser according to claim 12, wherein the drive member has an external thread, and the drive member mount includes an internally threaded hole, whereby rotation of the drive member causes displacement of the drive member relative to the drive member mount.

18. A riser according to claim 17, further including an electric drive and a control system mounted on the upper closure to automatically control the outlet valve.

19. An outlet valve for a riser of a surface irrigation system, the riser having a housing with an open upper portion and an outlet defining an orifice through which irrigation fluid is to be discharged, wherein the outlet valve includes:
   an upper closure securable to the riser for sealing the open upper portion:
   a valve member coupled to the closure and mountable within a flow path of the fluid, the valve member operable for opening and closing the outlet valve, and configured to seat against a valve seat of the housing and on an upstream side of the orifice, whereby the pressure of fluid within the outlet valve urges the valve member against the seat when the outlet valve is closed;
   a pivotable actuating lever having one end extending through the orifice and coupled to the valve member, an intermediate fulcrum, and on operable end for operating the valve member to open and close the outlet valve, and
   a support arm extending from the upper closure for supporting the actuating lever at the fulcrum, the support arm being integrally formed with the upper closure.

* * * * *